(12) United States Patent
Moser et al.

(10) Patent No.: US 6,556,127 B1
(45) Date of Patent: Apr. 29, 2003

(54) SPEAKER VERIFICATION METHOD

(75) Inventors: Thomas Moser, Löhningen (CH); Robert Van Kommer, Villars-sur-Glâne (CH)

(73) Assignee: Swisscom AG, Berne (CH)

( * ) Notice: Subject to any disclaimer, the term of this patent is extended or adjusted under 35 U.S.C. 154(b) by 0 days.

(21) Appl. No.: 09/284,140

(22) PCT Filed: Oct. 15, 1996

(86) PCT No.: PCT/EP96/04480

§ 371 (c)(1),
(2), (4) Date: Apr. 13, 1999

(87) PCT Pub. No.: WO98/16906

PCT Pub. Date: Apr. 23, 1998

(51) Int. Cl.⁷ .................................................. G05B 19/00
(52) U.S. Cl. ................. 340/5.84; 340/5.85; 340/5.8; 340/5.81; 340/5.22; 340/5.52; 704/246; 704/273
(58) Field of Search .............................. 340/5.84, 5.85, 340/5.8, 5.81, 5.22, 5.52, 825.12; 704/273, 246, 233, 240, 257, 270; 367/197, 198

(56) References Cited

U.S. PATENT DOCUMENTS

| | | | |
|---|---|---|---|
| 4,827,518 A | | 5/1989 | Feustel et al. |
| 5,274,695 A | | 12/1993 | Green |
| 5,297,194 A | | 3/1994 | Hunt et al. |
| 5,430,827 A | * | 7/1995 | Rissanen ..................... 704/272 |
| 5,548,647 A | * | 8/1996 | Naik et al. ................... 704/200 |
| 5,548,660 A | * | 8/1996 | Lemelson ................... 382/116 |
| 5,592,531 A | * | 1/1997 | Cheng et al. ............... 340/7.31 |
| 5,726,978 A | * | 3/1998 | Frodigh et al. ............. 370/252 |
| 5,806,040 A | * | 9/1998 | Vensko ......................... 704/273 |
| 5,907,597 A | * | 5/1999 | Mark ........................ 379/93.03 |
| 5,913,196 A | * | 6/1999 | Talmor ....................... 704/270 |
| 6,067,443 A | * | 5/2000 | Fuller et al. ................ 340/7.58 |

FOREIGN PATENT DOCUMENTS

| | | |
|---|---|---|
| EP | 0 454 363 | 10/1991 |
| WO | 94/12973 | 6/1994 |
| WO | 95/08821 | 3/1995 |

OTHER PUBLICATIONS

AT & T Technical Journal, vol. 65, No. 5, Sep. 1986, pp. 68–74, XP002037311 Birbaum Martha: "A Voice Password System for Access Security", pp. 68–74.

Speech Processing 1, Glasgow, May 23–26, 1989, vol. 1, May 23, 1989, Institute of Electrical and Electronics Engineers, pp. 524–527, XP000089779, Naik J M et al.: "Speaker Verification Over Long Distance Telephone Lines".

Doddington, "Speaker Recognition –Identifying People by Their Voices", Proceedings of the IEEE, vol. 73, No. 11, Nov. 1985, pp. 1651–1664.

Oglesby, "What's in a Number? Moving Beyond the Equal Error Rate", Speech Communication 17, Apr. 1995, pp. 193–208.

Furui, "An Overview of Speaker Recognition Technology", ESCA Workshop on Automatic Speaker Recognition, Identification and Verification, No date.

* cited by examiner

Primary Examiner—Michael Horabik
Assistant Examiner—Yves Dalencourt
(74) Attorney, Agent, or Firm—Pillsbury Winthrop LLP

(57) ABSTRACT

A method to enable a user of a system to obtain access to one or more services, for example, to enable a caller to access some information on a remote server. The system first prompts the caller to identify himself by entering a subscriber code. A speaker verification is then made using a voice comparison between the caller's voice and a voice reference associated with the subscriber the caller claims to be. Access to the requested services is given if the outcome of said voice comparison is positive. If the system does not store a sufficiently good voice reference to verify the identity of the subscriber the user claims to be with a predetermined degree of reliability, the caller is prompted to enter a confidential PIN code. If the PIN code entered is correct, access to the requested services is given and a new voice reference is stored.

7 Claims, 3 Drawing Sheets

SPEAKER VERIFICATION METHOD

Figure 1:
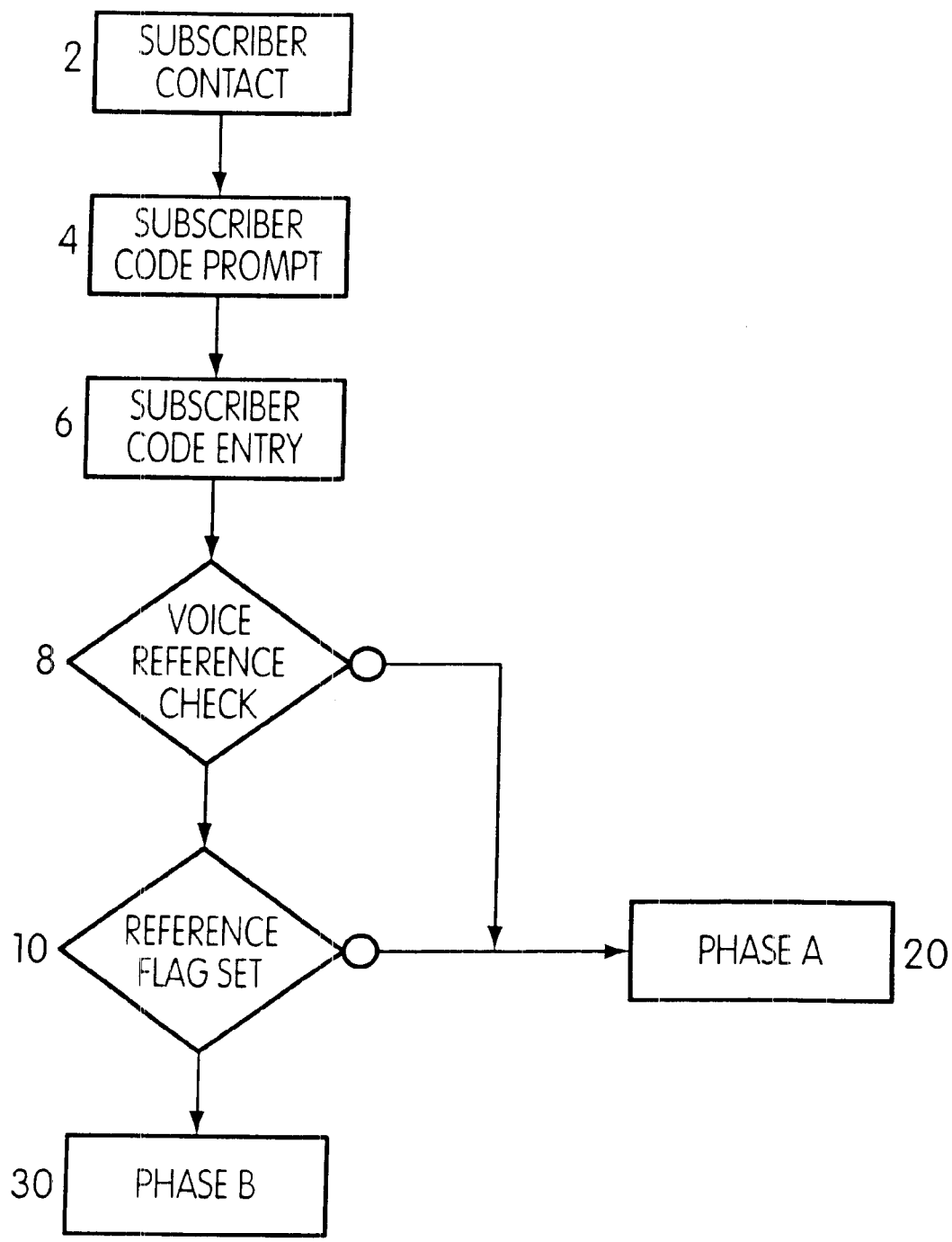

The invention relates to a method for enabling a user of a system to obtain access to one or more services according to the preamble of claim 1.

In many situations, it is necessary to identify users before giving them access to services or systems. These services include remote access to computers, electronic banking transactions, security access control for buildings, etc. In the same way, for many new telephone services it is necessary to verify unambiguously the identity of the caller. The caller identity usually cannot be determined from the access point in the telephone network used by the caller, as a caller may want to access those services from different access points.

An object of the present invention is to provide a method for enabling a user of a system to be identified and thus to obtain access to one or more services in a convenient way.

In a well-known method used for identifying a user in a system, the user is first requested to identify himself by entering a personal identification code (ID). The user is then requested to enter a secret password used to verify the claimed identity. Access to the requested services is given only if the entered password matches the entered ID. This is the method, for example, for using the calling cards proposed by many different telephone network operators. A subscriber who wants to use the service is usually furnished with a card, for example in credit card format, on which a subscriber code or number is printed. Furthermore, the subscriber is given a confidential personal identification code (PIN code) he has to remember. The subscriber code is needed for identifying the subscriber and the PIN code for verifying the entered identity.

To use the service, the subscriber calls a toll-free telephone number which connects him to the server which implements the calling card service. Once the call setup has been established, a speech generator in the server prompts the caller to enter first his subscriber number (which is printed on the card he has previously bought), and then his confidential PIN code. Those numbers may be entered manually on the telephone keyboard or, more comfortably, orally. In this latter case, the digits are recognized by a speech recognizing algorithm implemented in the server.

If the server recognizes the subscriber number entered and if the entered PIN code matches this subscriber number, the subscriber can then be connected to another subscriber within the network. The invoice for the telephone call will be sent automatically to the calling subscriber, independently of the place from which the call was made.

This method is very tedious for the subscriber who has to enter successively two numbers, one of which has to be memorized. The security is not optimal, as very often the PIN code is written down near or on the card.

The U.S. Pat. No. 5,297,194 describes a method in which the subscriber is prompted to enter one unique password digit-by-digit. A speech recognition algorithm running on the digital processing system of the server processes the information received and, using a statistical recognition strategy, determines the digits. After all digits have been recognized, and if the password is valid, the server uses a speaker verification algorithm to determine if the entered password has been spoken by a caller whose voice has been previously assigned to the password. Access to other services is allowed only if the verification algorithm establishes a match; otherwise, the system rejects the access inquiry and the call is terminated.

This method generally requires the subscribers to have previously enrolled in the system. Accordingly, the speaker verification algorithm uses a voice reference database comprising voice references collected from all authorized subscribers. Enrollment is accomplished by having the subscriber repeat a multidigit password several times. A voice reference is then obtained from those utterances. This voice reference is assigned to the password attributed to the subscriber.

This method requires active collaboration of the user at the time of enrollment and thus discourages in particular new subscribers. Moreover enrollment rollment is generally carried out in a single session from a single telephone apparatus, apparatus, for example from the telephone at the address of the new subscriber. The quality of the voice reference registered therefore very much depends upon the characteristics of the telephone apparatus originally used, and the subscriber risks not being recognized if he later calls from a different telephone.

Other speaker recognition methods and algorithms are described by George R. Doddington in "Speaker Recognition—Identifying People by their Voices", Proceedings of the IEEE, vol. 73, No. 11, November 1985, pp. 1651–1664; by John Oglesby in "What's in a number? Moving beyond the equal error rate", Speech Communication, vol. 17, 1995, pp. 193–208; and by Sadaoki Furui, in "An overview of Speaker Recog-nition Technology", ESCA Workshop on Automatic Speaker Recognition, Identification and Verification.

The object of the present invention is to provide an improved method for enabling a user of a system to obtain access to one or more services.

This object is attained according to the invention by means of supplementary steps as set forth in the characterizing part of claim 1.

Preferred embodiments of the invention follow from the dependent claims.

According to the invention, a subscriber receives a subscriber code and a confidential PIN code, as in the prior art. The subscriber code serves to identify the subscriber and the PIN code to verify the claimed identity.

To use the service, the user is first prompted (for example by a speech generator) to enter his subscriber code. This number may, for example, be printed on a subscriber card he has previously bought. A speaker verification algorithm is then used for verifying the identity claimed by the user by making a voice comparison between the user's voice and a voice reference stored in the system and associated with the subscriber code entered by the user. Access to the requested services is given if the user's voice matches said voice reference.

If said voice reference is not good enough to verify the claimed identity with a prescribed degree of reliability, the user is then prompted to enter his confidential PIN code. The PIN code is then checked, and, if the outcome of this check is positive, a new voice reference is created in a background process and associated with the subscriber code entered by the user.

One advantage of the invention, especially if used for identifying callers in a telephone network, is that the voice reference is created and stored during several sessions, usually from different locations and with various telephone apparatus. Thus, the voice reference stored for a given subscriber usually takes very different environmental conditions (noise, telephone lines, microphone, etc.) into account.

According to the invention, a specific enrollment session is not needed. Therefore, the method is very user-friendly, especially for new sub-scribers.

In the same way, the voice reference created takes into account possible user speech variations between two sessions. For example, it happens often that the user's voice is less sure and quick during the first session than during subsequent ones, when the user feels more confident.

It is possible to use a very high number of utterances for the voice reference without making the procedure too uncomfortable for the user. Even if the voice reference is already sufficiently good for a reliable verification of the user's identity, it is still possible to take new utterances into account in order to improve even more the quality of the voice reference and to adapt it to the user's voice variations.

Figure 2:
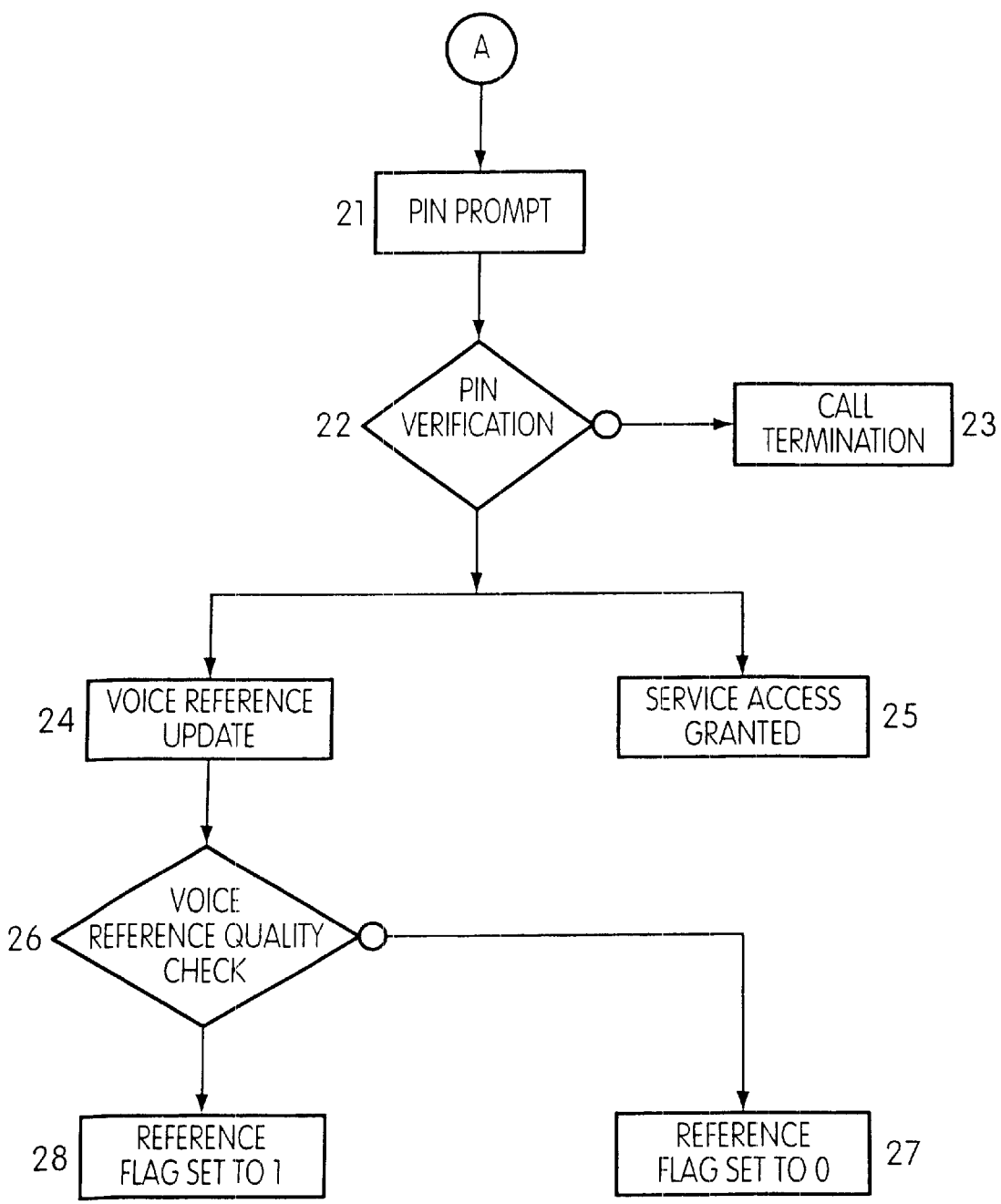
Figure 3:
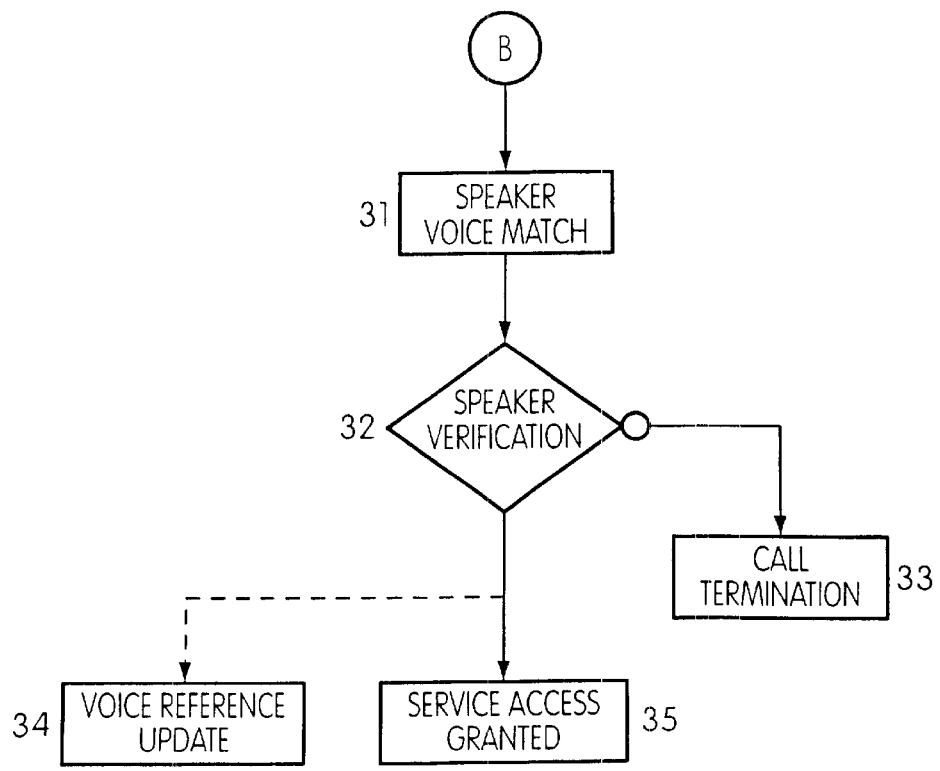
Figure 4:
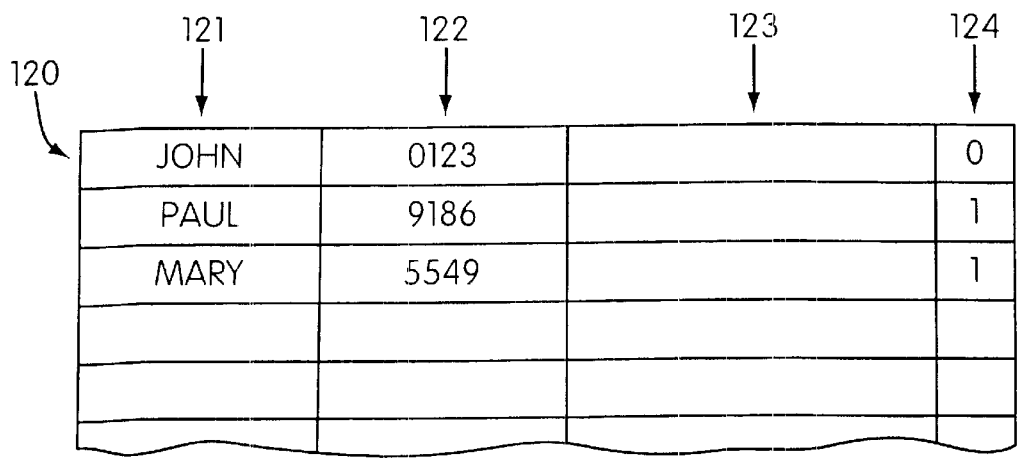

An embodiment of the invention is described below, by way of example only, and illustrated by the figures which show:

FIG. 1 is a flow chart of this embodiment,

FIG. 2 is a partial flow chart of the steps undertaken by the server when it has not stored sufficient reference voice parameters to recognize the subscriber with sufficient security, FIG. 3 is a partial flow chart of the steps undertaken by the server when it has already stored sufficiently good reference voice parameters to recognize the subscriber with a prescribed degree of reliability, FIG. 4 shows the structure of a database set up according to the method of the present invention.

Before the different steps of the method according to the invention are explained in detail, a database 120, used for implementing the method according to the invention, will be described, with reference to FIG. 4. Each record of the subscriber database corresponds to one subscriber and contains all information needed to identify and verify the identity of the user. The associated record for each subscriber includes a subscriber code field 121, a PIN is code field 122, a voice reference field 123 and a reference flag 124. The subscriber code field 121 includes enough digits to designate unambiguously each subscriber. In this example, the subscriber code field includes alphanumerical digits; however, in many applications, only numbers will be allowed. PIN code field 122 includes enough digits to verify the claimed identity of the user with a prescribed degree of reliability which may depend on the application. Again, digits can be either alphanumerical or just numerical. The voice reference field 123 stores a voice reference corresponding to the subscriber. Depending on the speaker verification algorithm used, the voice reference field may store several samples of the voice (utterances) of the subscriber, one sample extracted from one or several utterances, or one or several parameters extracted from one or several previous utterances of the subscriber. Reference flag 124 is a single bit indicating if the voice reference stored in field 123 is of sufficiently good quality to verify the identity of the subscriber with the prescribed degree of reliability.

The method used by the system will now be explained with reference to FIGS. 1 to 3, which relate more particularly to caller identification in a telephone network.

A user wishing access to the services offered calls the server implementing the method of the present invention (step 2). During step 4, the user is first greeted and then prompted to enter his subscriber code (or some other form of identification data).

Preferably, the subscriber code is entered orally, for example sequentially and digit-by-digit. Alternatively, the subscriber code may be entered manually with a keyboard, for example on the user's receiver. In this latter case, the user will be prompted to say something, for example to repeat a standard sentence.

The next step 6 consists in subscriber identification. If the subscriber code is entered orally, subscriber identification implies speech recognition to extract the subscriber code from the sentence spoken by the user. If the subscriber code is entered manually using the keyboard on the receiver, the generated pulses or tones are used to determine the digits of the subscriber code. Steps 4 and 6 could possibly be repeated several times until the transmission quality is sufficiently good for identifying the subscriber code. As a different subscriber code is assigned to each different subscriber, after step 6 the system knows the identity claimed by the user.

A test is made during step 8 to check if a voice reference 123 has already been assigned in database 120 to the subscriber the user claims to be. If the outcome of this test is negative, phase A is executed, described below in connection with FIG. 2. On the other hand, if a voice reference 123 has already been assigned to the identified subscriber, the reference flag 124 is checked during step 10. We will see below that this flag is set to 1 if, and only if, the voice reference 123 assigned to the subscriber is sufficiently good (depending on the algorithm used) in order to verify his identity with the desired degree of reliability.

If the reference flag 124 was at 0, phase A, discussed below in relation to FIG. 2, is executed (step 20); on the other hand, if it was set to a positive value, phase B, discussed below in relation to FIG. 3, is executed (step 30).

The reference flag 124 can also be set to 0 each time a new subscriber is stored in the database. In this case, it is possible to bypass the test 8.

Phase A will now be described in relation to FIG. 2. Phase A is executed when no voice reference 123 has been assigned to the subscriber in the database 120, or when the voice reference stored is not sufficiently good to verify the identity of the subscriber with the prescribed degree of reliability. After a few calls, the identity of the subscriber will be verified automatically from the subscriber's voice, and this phase will no longer be executed.

At beginning of phase A, during step 21, the user is prompted to enter his PIN code. This PIN code is confidential; it can either be entered orally or preferably manually using the keyboard on the receiver. In the first case, a speech recognition algorithm is used to recognize the orally entered PIN code; in the second case, the PIN code is determined from selection pulses or tones generated manually with the keyboard. During step 22, a verification is made to check if the PIN code entered by the user matches the PIN code 122 assigned to the subscriber the user claims to be. If the PIN code is wrong, access to services is denied and the call is terminated (step 23). In a variant embodiment, the user may have a second or even a third chance to re-enter his PIN code if the first try failed.

On the other hand, if the PIN code is correct, access is given to the requested service (step 25). Depending on the application, the service can be connection with another network subscriber, access to a database, electronic funds transfer, credit card validation, subscriber personal identification, invoicing of the call on the user's account with the network provider, etc. However, it should be noted that the invention is not limited to these applications, which are given as examples only.

In a background process (step 24), and simultaneously with step 25, a new voice reference is created using the user's voice sample (utterance) and assigned to the subscriber (field 123). Step 26 is a test to check if the voice reference created is now sufficiently good to verify the subscriber with the prescribed degree of reliability. What is meant by "sufficiently good" depends on the algorithm used for voice verification; the prescribed degree of reliability obviously depends on the application. It is possible for instance to determine that the voice reference is sufficiently good if it has been created from a minimum number of utterances, for example ten. In this case, the voice reference associated with each user is regarded as good enough as soon as said user has had access to the system 10 times or more. Counting means are necessary which store in an additional field associated with each subscriber code 121 the number of accesses entered by this subscriber. Alternatively, it is possible according to the speaker verification algorithm used to determine directly from certain parameters of the voice reference 123 whether the latter is sufficiently good. In the case of a negative response, the reference flag 124 corresponding to the subscriber is set or kept at zero in the course of step 27. On the other hand, if the voice reference is now sufficient, the reference flag 124 is set to 1 in the course of step 28. In this case, at the time of subsequent calls of the subscriber, only the subscriber code is required, as a rule, and, instead of phase A, the system carries out phase B, which will now be discussed in relation to FIG. 3.

Phase B is carried out for calls of subscribers for whom the voice is sufficiently known to permit a sufficiently reliable verification of identity. In the course of step 31, the subscriber identity claimed by the user is verified using a speaker verification algorithm. In so doing, a comparison is made between the user's voice utterance and the voice reference 123 assigned in the system to the claimed subscriber. Any algorithm for verification of a known person can be used, for example an algorithm such as is described in one of the aforementioned documents to verify whether the user's utterance matches the voice reference associated with the subscriber code 121 entered by the user.

If the outcome of this test (step 32) is all right, i.e. if the identity of the user has been verified, access is given to the requested services (step 35). If, on the other hand, the entered voice cannot be matched substantially to the voice reference assigned to the claimed subscriber, access to the requested services is denied and the call is terminated (step 33). In a variant embodiment, phase A is executed, instead of step 33, when the user's identity cannot be verified from his voice. In this case, as described above, the user is prompted to enter his PIN code.

In a preferred embodiment of the invention, the user's utterance is used to create a new voice reference 123 in a background step 34, even if the voice reference assigned to the subscriber is already sufficiently good. This new voice reference is stored in field 123 associated with the subscriber code 121 entered by the user. In this way the system adapts progressively to variations in the voice of the subscriber owing to aging, seasonal temperature variations, different telephone apparatus, etc.

The above description relates in particular to use of the method in a is telephone network. It is clear, however, that the invention can also be applied to other types of transactions or networks. For example, the invention can also be used for the verification of identity in automatic teller machines or in access control devices.

What is claimed is:

1. Method for enabling a user of a system to obtain access to one or more services, comprising:

prompting the user to identify himself with a subscriber code;

provided that said subscriber code is registered and a voice reference has been assigned to said subscriber code, verifying the subscriber's identity by comparing the user's voice to said voice reference associated with the subscriber code entered by the user, access to the requested services being given if the user's voice matches said voice reference;

wherein the following are undertaken during an initial phase when no voice references are yet associated with the subscriber code entered by the user, or when the voice reference associated with the subscriber code entered by the user is not yet sufficiently good to verify the subscriber's identity with a predetermined degree of reliability:

prompting said user to enter a PIN code;

comparing said PIN code entered by the user with a PIN code associated with the subscriber code entered by the user, if the PIN code entered by the user matches the PIN code associated with the subscriber code entered by the user, giving the user access to the requested services, creating a new voice reference and associating said new voice reference with said subscriber code, or provided that a voice reference is already associated with the said subscriber code, improving said voice reference by said new voice reference.

2. Method according to claim 1, in which the user is prompted to enter his subscriber code orally, a speech recognition algorithm being used to recognize the subscriber code entered.

3. Method according to claim 1, in which the user is prompted to enter his subscriber code on a keyboard, tones or pulses generated by typing the keyboard being used to recognize the subscriber code, and in which the user is prompted to speak a sentence allowing speaker verification.

4. Method according claim 1, in which the user is prompted to enter his PIN code when the user's voice does not match said voice reference associated with the subscriber code entered by the user, access to the requested services being given if the PIN code entered by the user matches the PIN code associated with the subscriber code entered by the user.

5. Method according to claim 1, in which the user is prompted to enter his PIN code orally, a speech recognition algorithm being used to recognize the PIN code entered.

6. Method according to claim 1, in which the user is prompted to enter his PIN code on a keyboard, tones or pulses generated by typing the keyboard being used to recognize the subscriber code entered.

7. Method according to claim 1, in which a new voice reference is created and associated with the subscriber code entered by the user when the user's voice matches said voice reference associated with the subscriber code entered by the user.

* * * * *